Figure 1:
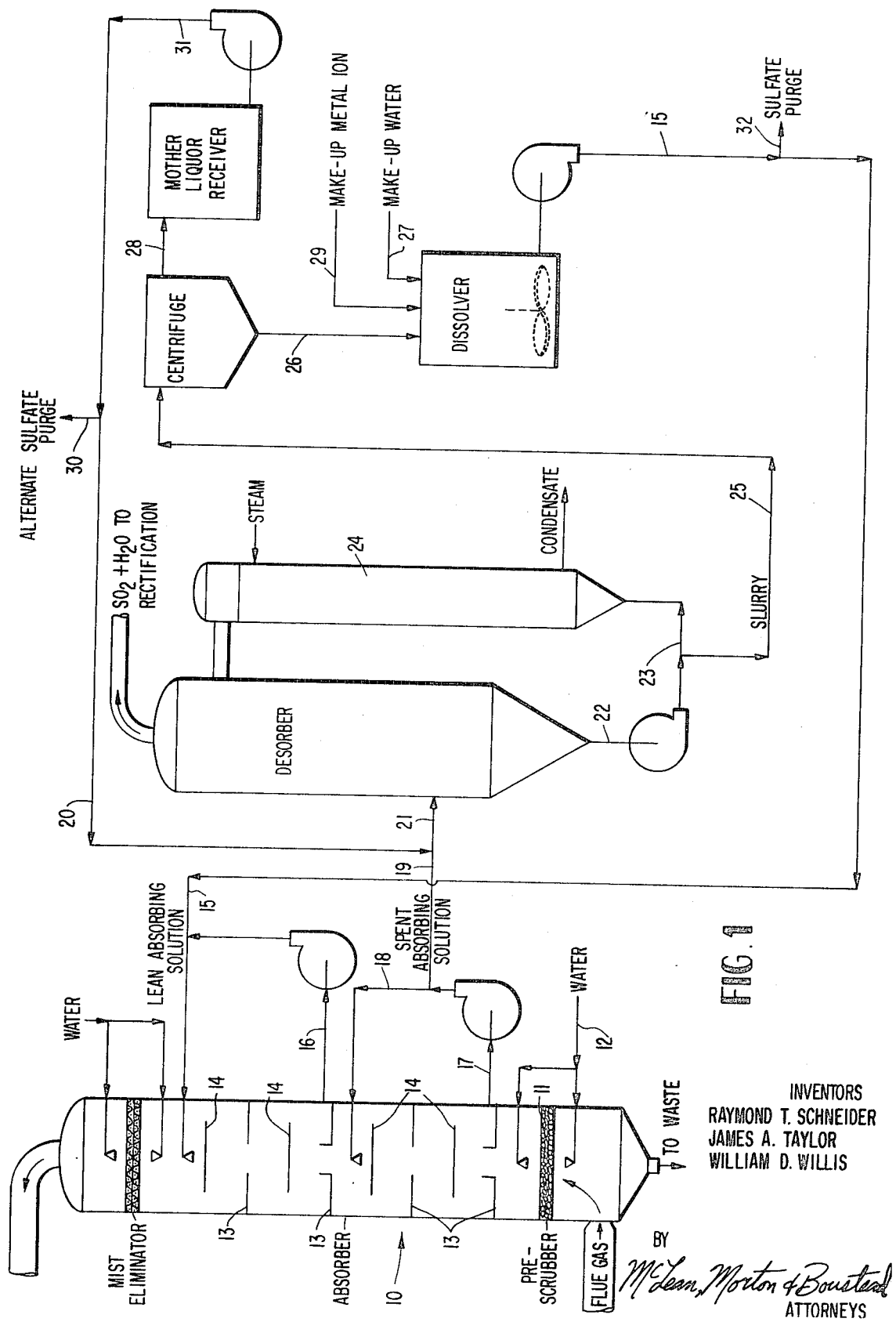

United States Patent
Schneider et al.

[15] 3,653,812

[45] Apr. 4, 1972

[54] PROCESS FOR REMOVAL OF SULFUR DIOXIDE FROM GAS STREAMS

[72] Inventors: Raymond T. Schneider; James A. Taylor; William D. Willis, all of Lakeland, Fla.

[73] Assignee: Wellman-Lord, Inc.

[22] Filed: July 18, 1969

[21] Appl. No.: 843,163

[52] U.S. Cl. ................................23/2 SQ, 23/129, 23/178
[51] Int. Cl. ................................C01b 17/60, C01d 5/00
[58] Field of Search..................23/2, 129, 130, 178, 302

[56] References Cited

UNITED STATES PATENTS

| | | | |
|---|---|---|---|
| 1,865,754 | 7/1932 | Hand | 23/302 X |
| 2,671,716 | 3/1954 | Ayres | 23/302 X |
| 2,719,075 | 9/1955 | Allen | 23/129 |
| 3,208,834 | 9/1965 | Schulze | 23/302 |
| 3,485,581 | 12/1969 | Miller et al. | 23/178 |

Primary Examiner—Oscar R. Vertiz
Assistant Examiner—G. O. Peters
Attorney—Eugene L. Bernard, Martin J. Brown, W. Brown Morton, Jr., John T. Roberts, Malcolm L. Sutherland, John W. Behringer, James N. Dresser and Morton, Bernard, Brown, Roberts & Sutherland

[57] ABSTRACT

The disclosure is of an improvement in a sulfur dioxide removal process wherein a sulfur dioxide-containing gas is contacted with an aqueous absorbing solution of a metal sulfite, e.g., sodium sulfite, to yield a spent absorbing solution of metal bisulfite, and the latter is subjected to conditions of temperature, pressure and residence time in a desorption zone sufficient to decompose the bisulfite to the sulfite, sulfur dioxide and water, with the water and sulfur dioxide being evaporated and the sulfite precipitated from solution. The precipitated sulfite is separated from its mother liquor and dissolved in water and the resultant solution is recycled as fresh absorbing solution. The improvement comprises recycling to the desorption zone the major portion, preferably substantially all, of the mother liquor from which the precipitated sulfite has been separated.

23 Claims, 2 Drawing Figures

INVENTORS
RAYMOND T. SCHNEIDER
JAMES A. TAYLOR
WILLIAM D. WILLIS

BY
McLean, Morton & Boustead
ATTORNEYS

PROCESS FOR REMOVAL OF SULFUR DIOXIDE FROM GAS STREAMS

This invention relates to a process of removing sulfur dioxide from a gas containing same, e.g. from a waste gas such as a flue gas, by contacting the gas with an aqueous absorbing solution of sodium, lithium or beryllium sulfite. More particularly, it relates to an improvement in such a process where spent absorbing solution is desorbed to release the sulfur dioxide which has been removed from the gas mixture and to regenerate the absorbing solution.

In U.S. Pat. Application Ser. No. 785,724 of Terrana, Miller and Taylor, filed Dec. 20, 1968, and herein incorporated by reference, there is disclosed a process for removing sulfur dioxide from a sulfur dioxide-containing gas which includes the steps of:

contacting the gas in an absorption zone with a lean, aqueous absorbing solution of sodium, lithium or beryllium sulfite so as to absorb the sulfur dioxide and yield a spent absorbing solution of the corresponding metal bisulfite;

subjecting spent absorbing solution in a desorption zone to conditions of temperature, pressure and residence time sufficient to decompose bisulfite to sulfite, sulfur dioxide and water, to evaporate sulfur dioxide and water from the solution, and to cause sulfite to precipitate from the solution;

dissolving precipitated sulfite in water;

and recycling the resulting sulfite solution to the absorption zone. The mother liquor also was recycled to the absorption zone.

It has now been found, however, that the overall efficiency of the above process can be significantly improved by incorporation therein of a step providing for recycling to the desorption zone the major portion, (e.g., more than half) preferably substantially all, of the mother liquor of the precipitated sulfite. The effect of the incorporation of the above step — as opposed, say, to recycling the mother liquor to the fresh absorbing solution entering the absorption zone — is a substantial savings in the energy requirements of the system by providing a high bisulfite-to-sulfite ratio in the decomposition zone which makes subsequent decomposition and crystallization more efficient. Additionally, the lean absorbing solution fed to the absorbing zone will have a high sulfite to bisulfite ratio making the absorption more efficient. Thus, for example, it has been found that the energy required for a specific flue gas treatment plant wherein the mother liquor is returned to the absorbing zone may be equivalent to, say, about 20 pounds of steam per pound of sulfur dioxide recovered, whereas by routing the mother liquor back to the desorption, rather than the absorption, zone the steam requirement can be significantly reduced.

The improved process of the present invention is particularly useful for removing sulfur dioxide from waste gases containing same, e.g. from smelter gases, off gases from chemical plants, or stack gases from coal or oil burning furnaces when the concentration of sulfur dioxide is generally from about 0.05 to about 10 mole percent, and frequently less than 0.5 mole percent. However, the process is not limited to such applications. Rather, it can be employed wherever the objective is to remove sulfur dioxide from gases containing the same, be they waste gases or otherwise, and be the sulfur dioxide present therein in large or small concentration.

The contacting of the sulfur dioxide-containing gas with an aqueous solution of the metal sulfite is effected at a temperature which is sufficient for the sulfur dioxide, the metal sulfite and the water to inter-react and yield the corresponding metal bisulfite (also known as the "hydrogen sulfite"). The contacting temperature should be lower, however, than the decomposition point of the desired bisulfite. With sodium sulfite as the absorbing solution, for example, the reaction in the absorption zone can be represented by the following equation:

I. $Na_2SO_3 + SO_2 + H_2O \rightarrow 2\ NaHSO_3$ Generally suitable in the absorption zone are temperatures of at least about 90° F., preferably at least about 100° F., up to about 230° F., preferably up to about 190° F., and most preferred are temperatures in the range of about 120° to 180° F. Flow rates of the aqueous absorbing solution through the absorption zone are adjusted according to the sulfur dioxide concentration in the gas being treated and the sulfite concentration in the solution so that substantially all, e.g. 90 percent or more, of the sulfur dioxide is removed from the gas by reaction with the sulfite solution.

The fresh, or "lean," absorbing solution used in the absorption zone is an aqueous solution of the metal sulfite, preferably sodium sulfite, and contains a sufficient concentration of the sulfite to effect removal of the desired amount of sulfur dioxide from the gas being treated. Generally, the lean absorbing solution contains about 10 to 35 weight percent of the sulfite, not all of which needs to be actually dissolved, however. In other words, a slurry, while it may be more difficult to handle than a complete solution, can be employed as the lean absorbing solution used in the process. In the case of sodium sulfite, for example, the limit of that compound's solubility in water at 100° F. is only about 26 weight percent. The use of greater concentrations thereof in the lean absorbing solution will, therefore, usually mean that the lean absorbing solution is in slurry form.

There may be tolerated in the lean absorbing solution minor, non-deleterious amounts of other salts of the metal, e.g. the metal sulfate and the metal bisulfite. Generally, the metal sulfate level will be up to about 10 weight percent, preferably less than about 6 weight percent and most preferably less than about 4 weight percent, and the metal bisulfite level will be up to about 15, preferably up to about five, weight percent. The presence of these other salts can be occasioned by the cyclic nature of the process, as will be apparent from the more detailed discussion hereinafter. The metal sulfate, e.g. sodium sulfate, can result from the occurrence of various side reactions involving the metal sulfite, the sulfur dioxide, and any sulfur trioxide or oxygen which may be present in the gas being treated. The propensity for sulfate-forming reactions generally increases as the temperature increases. In order to retard such sulfate production it is generally preferred that minor, effective amounts, e.g. about 0.01 to 0.3 weight percent, of an oxidation inhibitor such as hydroquinone be present in both the lean and the spent absorbing solutions. This inhibitor can be added at any suitable stage in the process, so long as it is present in effective amounts in the absorption zone and, most especially, during the highest temperature treatment of the process, desorption.

Generally, the total solids content of the lean absorbing solution (i.e., the portion which would remain upon complete removal of the water content) will be about 15 to 35, preferably about 20 to 30, weight percent. Generally at least about 75 weight percent of the solids, preferably at least about 85 weight percent thereof, will be comprised of the metal sulfite. By way of further explanation, since one weight unit of dissolved sodium bisulfite, for example, will be converted to about 0.91 weight unit of solid sodium pyrosulfite upon complete removal of the water from the solution — as is more fully explained hereinafter — then a one weight percent solution of sodium bisulfite has, in the parlance used herein and in the claims, a "solids content" of only about 0.91 weight percent.

In accordance with an advantageous embodiment of this invention, the contacting of the sulfur dioxide-containing gas with the lean absorbing solution is effected by allowing the solution to descend by gravity over a series of alternating disc and ring (also known as "disc and doughnut") baffles while passing the gas upwardly through the descending solution. Thus the absorption zone can advantageously be a counter-current liquid-gas contacting tower having alternating disc and ring baffles along its height. The design and construction of such a tower can be according to specifications well known in the art.

The spent absorbing solution removed from the absorption zone will generally contain about 10 to 50, usually about 25 to 40, weight percent of metal bisulfite; up to about 20, most often about 3 to 10, weight percent of the metal sulfite; and up to about 10, most often less than about 5, weight percent of the metal sulfate. Again, while handling problems and equipment requirements can be diminished when the spent absorbing solution is a complete solution it is, nevertheless, also contemplated that a portion of the solids content can be undissolved and, consequently, that the spent absorbing solution can be removed from the absorption zone in the form of a slurry, or can be removed as a complete solution but be converted to a slurry prior to being introduced to the desorption zone. In the event the solution is to be pumped from an absorption zone to a desorption zone, the principal requirement in this regard is that the solution, whether it be a complete solution or a slurry, be pumpable so that it can be removed from the absorption zone and conducted to the desorption zone.

In an advantageous embodiment of the present invention, a portion of the spent absorbing solution removed from the absorption zone is recycled to the absorption zone rather than sent to the desorption zone. The purpose of such recycling is to exert control over the ratio of bisulfite to sulfite in the spent absorbing solution being introduced to the desorption zone, which ratio as discussed above the affects the efficiency of desorption. Generally, the weight ratio of bisulfite to sulfite in the total of recycled mother liquor and removed spent absorbing solution introduced to the desorption zone is at least about 1:1, preferably at least about 4:1, or even at least about 9:1. One indication of the bisulfite-to-sulfite ratio in the spent absorbing solution is the pH value of the solution. The lower the solution pH, the greater the bisulfite-to-sulfite ratio. In the sodium system, for instance, the above weight ratios of 1:1 and 9:1 (calculated as pounds of $NaHSO_3$ per pound of $Na_2SO_3$) are generally represented by pH values of about 6.0 and 5.0, respectively, for an aqueous saturated solution.

The amount of dissolved metal bisulfite in an aqueous solution can also be expressed in terms of the equivalent amount of the metal pyrosulfite (also known as the "meta-bisulfite") which can be obtained by dehydration of the bisulfite. To give an example, sodium bisulfite (i.e., $NaHSO_3$) is believed by some to exist as such only when in solution in water. When forced out of solution the bisulfite apparently is dehydrated and converted to sodium pyrosulfite (i.e., $Na_2S_2O_5$) which, then, can be designated the crystallized form of the bisulfite. This conversion of sodium bisulfite to sodium pyrosulfite can be represented by the following equation:

II. $2 NaHSO_3 \rightarrow Na_2S_2O_5 + H_2O$

Thus it is seen that one mole of the sodium bisulfite is equivalent to (i.e., will yield on dehydration) one-half mole of the pyrosulfite, and that one weight unit of the bisulfite is equivalent to about 0.91 weight unit of the pyrosulfite.

As regards, then, the hypothetical sodium bisulfite solutions mentioned above in discussing the pH of the spent absorbing solution, if a 27 weight percent solution of sodium bisulfite were instead identified in terms of equivalents of pyrosulfite, it would be by using one of the following expressions: 25 weight percent solution of sodium bisulfite (calculated as pyrosulfite) or 25 weight percent solution of sodium bisulfite (calculated as $Na_2S_2O_5$).

In the process of the present invention substantially all of the bisulfite content of both the lean and the spent absorbing solutions will generally be dissolved, as opposed to being in suspension in the dehydrated form, i.e. as the pyrosulfite. This is because the sulfites of sodium, lithium and beryllium are less water soluble than their bisulfite counterparts and will therefore precipitate out of solution first. The recitations herein and in the claims, however, of bisulfite content (either in terms of solution concentration or expressed as bisulfite-to-sulfite ratio, or whatever) are intended to embrace any pyrosulfite which may be present as well. Thus, for example, the recitation of a 2 to 1 molar ratio of sodium bisulfite to sodium sulfite is intended to include an aqueous solution containing one mole of dissolved sodium sulfite, one mole of dissolved sodium bisulfite and one-half mole of suspended sodium pyrosulfite, as well, of course, as the more obvious example of an aqueous solution containing one mole of dissolved sodium sulfite and two moles of dissolved sodium bisulfite.

Temperatures in the desorption zone are maintained sufficiently high to provide for the decomposition of the metal bisulfite back to the sulfite, sulfur dioxide, and water. In the sodium system, for example, the reaction can be represented by the following equation:

III. $2 NaHSO_3 \rightarrow Na_2SO_3 + SO_2 + H_2O$ Also, the combined conditions of temperature, pressure, and residence time in the desorption zone must be such as to effect evaporation of sulfur dioxide and water from the solution and precipitation from the solution of the metal sulfite. Generally suitable are temperatures in the range of about 200° to 400° F., while it is often preferred to employ temperatures of at least about 212° F., or even 230° F., and no higher than about 300° F., or even about 290° F. Sulfate production, even with the presence of an oxidation inhibitor, can become troublesome at temperatures above about 300° F. Also, corrosion of stainless steel equipment can become a problem at the higher temperatures. The pressure employed must be sufficiently low to permit vaporization of water at the desorption zone temperature. While subatmospheric pressures can be employed, it is generally preferred to operate at atmospheric pressure and above, say up to about 80 p.s.i.a. (pounds per square inch absolute). The residence time under these conditions of temperature and pressure is that sufficient to permit water and sulfur dioxide to separate from the solution as a gaseous mixture which can be removed from the desorption zone and to allow for the formation of the metal sulfite crystals. Often suitable will be residence times of about one-half to 4 hours, preferably, say, about 1 to 3 hours.

In accordance with a preferred embodiment of the present invention the desorption zone is made up of a plurality of distinct desorbing vessels, (preferably two or three) each of which is maintained at a different pressure, and into which the spent absorbing solution is conducted in parallel feed relationship. In accordance with this preferred embodiment the vessels are staged in multi-effect relationship wherein the overhead vapors from all but the lowest pressure vessel are brought into indirect heat exchange contact with the solution being desorbed in the next lowest pressure vessel. By use of this parallel feed of spent absorbing solution and multi-effect staging of the desorbing vessels, the overall desorption is effected more efficiently, in terms of energy expended.

The sulfite which is present as a precipitate in the desorption zone can be separated from its mother liquor by any suitable technique. It is usually most advantageous when operating the process in a continuous manner to constantly withdraw as bottoms from the desorption zone, a slurry of the precipitated sulfite in its mother liquor and then subject the slurry to filtration, decantation or centrifugation to effect the separation.

The separated sulfite, as stated above, is dissolved in water and recycled as lean absorbing solution to the absorption zone. A preferred source for the water is that evaporated in the desorption zone. Thus, the overhead mixture of sulfur dioxide and water that issues from the desorption zone is preferably recovered and the water content separated and used to form lean absorbing solution. The $SO_2$, of course, is of great commercial value. If desired, it can be rectified to obtain a more pure product.

While the mother liquor from the sulfite separation can, if desired, be recycled directly to the desorption zone via an inlet to the zone which is reserved for its use alone, it will generally be preferred to effect the recycling indirectly by combining the mother liquor with the spent absorbing solution at some point upstream of the desorption zone. Preferably the two streams (the mother liquor and the spent absorbing solution) will be combined at a point immediately upstream of the desorption zone — that is, at a point, downstream of which the combined solution flows without detour to the desorption zone. Thus, for instance, it is preferred not to recycle mother liquor to spent absorbing solution which has been removed from the absorption zone until after a portion of the removed spent absorbing solution has been diverted back to the absorption zone.

Figure 2:
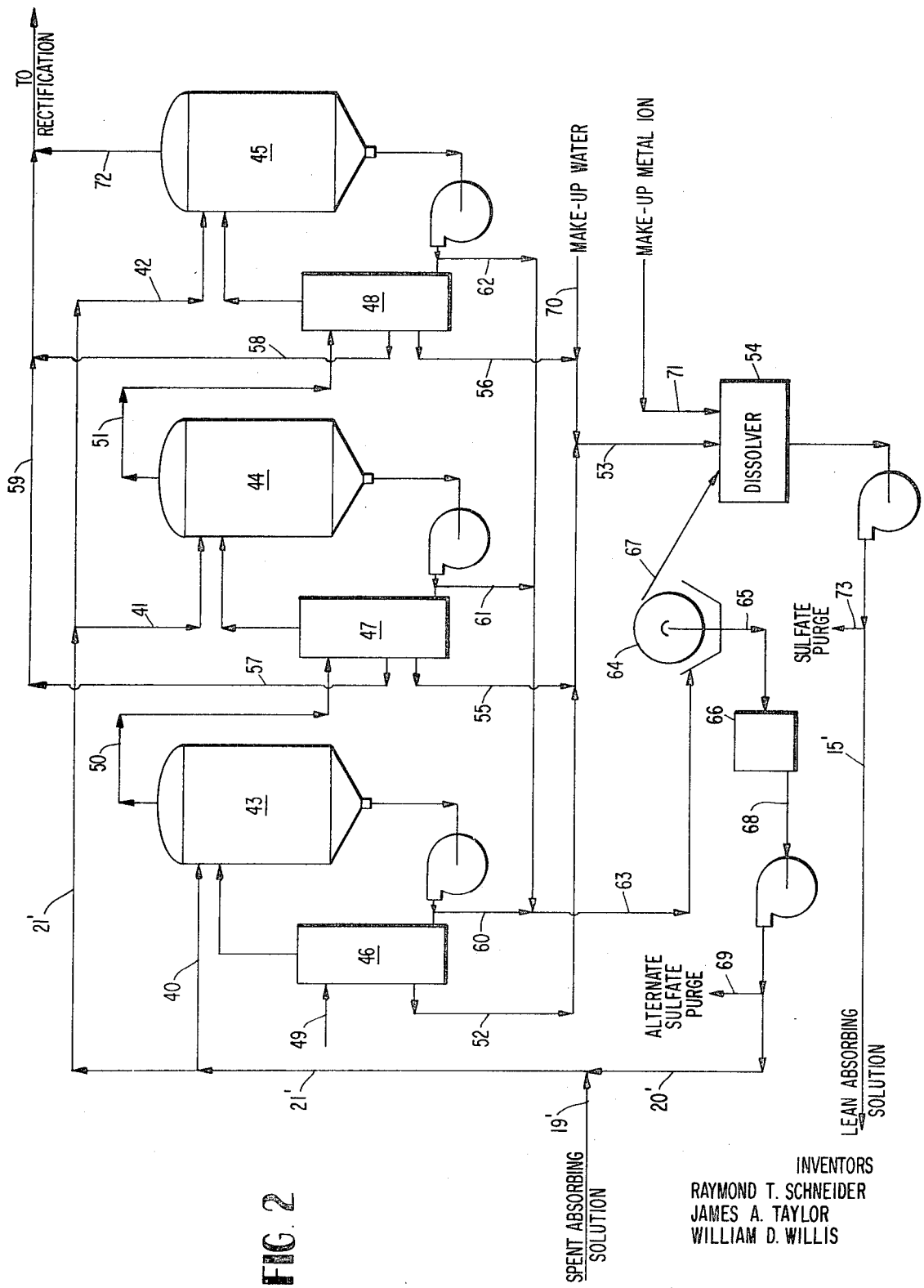

The present invention will be better understood by considering the accompanying drawings, in which:

FIG. 1 is a flow sheet of a process employing the present invention in the removal and recovery of sulfur dioxide from a flue gas; and FIG. 2 is a flow sheet of a modified version of the desorption, separation, and sulfite dissolution segments of the process illustrated in FIG. 1.

EXAMPLE I

Referring now to FIG. 1, sulfur dioxide-containing flue gas, e.g. from a coal-burning furnace, enters vessel 10 near the bottom thereof at a temperature, for example, of about 250° F. The flue gas, which typically contains about 0.3 mole percent of sulfur dioxide, passes upwardly through a prescrubber zone in vessel 10 in which zone it is routed through a bed of column packing 11 which is maintained wet and flushed with water, the latter being supplied through line 12. The prescrubbing is advantageously conducted in accordance with the apparatus and procedure described in the copending application of Miller and Willis, Ser. No. 681,680, filed Nov. 9, 1967, herein incorporated by reference. This pre-scrubbing with water serves to remove suspended solids such as fly ash and highly water-soluble components, e.g. sulfur trioxide, from the entering flue gas. The pre-scrubbed flue gas next enters a main absorption zone wherein it passes upwardly, around ring baffles 13 and disc baffles 14, through a descending flow of lean absorbing solution, the latter being supplied through line 15. In a typical example using sodium sulfite, the lean absorbing solution in line 15 contains about 22 weight percent sodium sulfite, about 3 weight percent sodium bisulfite (calculated as the pyrosulfite, $Na_2S_2O_5$), about 2.0 weight percent sodium sulfate, and the balance being essentially water. Substantially cleansed of sulfur dioxide, the flue gas next passes through a mist eliminator, which, for example, is a layer of woven wire mesh wetted on both sides with sprays of water and then the flue gas is released to the atmosphere at, for example, a temperature of about 120° F. and containing about 0.03 mole percent sulfur dioxide.

The spent absorbing solution in line 19 is combined with recycle mother liquor in line 20 and the combined stream is introduced through line 21 into the desorber. The conditions of temperature, pressure, and residence time in the desorber are so maintained as to effect the desired decomposition, evaporation, and precipitation. Using the aforementioned sodium system example, a temperature of about 230° F., a pressure of about 15 p.s.i.a., and an average residence time of about 2 hours is typically maintained in the desorber. Heat to the system is supplied by indirect heat exchange contact between steam (for example, at about 320° F. and 75 p.s.i.g.) and a recycle stream of the slurry which is sent through lines 22 and 23 to calandria 24. Overhead vapors from the desorber, which can typically contain about 10 weight percent sulfur dioxide and the balance being essentially water, can be sent to rectification (not shown) to obtain substantially anhydrous, liquid sulfur dioxide.

Slurry from the desorber is sent through lines 22 and 25 to a centrifuge wherein the undissolved solids are separated from the liquid solution. The solids comprise the sulfite precipitated in the desorber and may also include some undissolved sulfate. The damp solids from the centrifuge are sent through line 26 to the dissolver, wherein they are dissolved in make-up water supplied through line 27. In the sodium system these solids can typically contain about 10 weight percent water, about 80 weight percent sodium sulfite, the equivalent of about 8 weight percent sodium pyrosulfite and about 2 weight percent of sodium sulfate. A suitable source of the water added to the dissolver can be from the rectification (not shown) of the sulfur dioxide-containing overhead from the desorber. The solution obtained in the dissolver constitutes lean absorbing solution; it is sent through line 15 to the absorption zone of vessel 10, as described above. A portion of the lean absorbing solution can be either continuously or periodically bled through line 32, the purpose therefor being to keep the sulfate concentration in the system relatively low. The sulfate, especially in the sodium system, tends to precipitate with the sulfite in the desorber. Where, however, it is observed to remain in solution in the mother liquor in substantial amounts, then it can be removed from the system via alternate sulfate purge line 30. While sulfate removal by bleeding off a portion of the lean absorbing solution through line 32 will necessarily remove sulfite from the system as well, this need not be significantly detrimental to the economics of the process if the sulfate formation is kept low to begin with — by the use of antioxidants, for example — and the need for such purging thereby held to a minimum.

Make-up metal ion for the system is supplied to the dissolver through line 29. Thus, for example, in the sodium system there can typically be added through line 29 a 50 weight percent aqueous solution of sodium hydroxide in amounts sufficient to replace sodium loss or removal from the system, e.g. by purging sodium sulfate therefrom, in the manner just discussed. Sodium hydroxide reacts in the absorption zone with sulfur dioxide to yield sodium sulfite according to the equation:

IV. 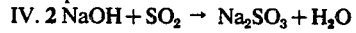$2 NaOH + SO_2 \rightarrow Na_2SO_3 + H_2O$

The liquid removed from the centrifuge through line 28 is the mother liquor and it is sent to a mother liquor receiver from which it is recycled through lines 31, 20 and 21 back to the desorber.

EXAMPLE II

In FIG. 2 is illustrated a modified version of the desorption and regeneration portion of the system depicted in FIG. 1. The essence of the modification is that the single desorbing vessel of FIG. 1 is replaced in FIG. 2 by three desorbing vessels, 43, 44 and 45, which are arranged in multiple effect relationship, and that filtering means 64, rather than a centrifuge, is used to separate precipitated sulfite from its mother liquor. Using a typical sodium sulfite system for illustration purposes, the operation of that portion of the system which is depicted in FIG. 2 can proceed as follows, with discussion of sulfate concentrations being omitted for purposes of brevity:

Spent absorbing solution containing about 7 weight percent sodium sulfite, about 28 weight percent sodium bisulfite (calculated as the pyrosulfite, $Na_2S_2O_5$), and the balance being essentially water is introduced through line 19' to main feed line 21' and thence to parallel feed lines 40, 41 and 42 and into desorbing vessels 43, 44, and 45, respectively. There is combined with the spent absorbing solution in line 19' a recycle stream of mother liquor supplied through line 20'. Composition of the combined stream (line 21') is about 8 weight percent sodium sulfite, about 32 weight percent sodium bisulfite (calculated as $Na_2S_2O_5$), and the balance being essentially water.

Desorbing vessel 43 is operated at the highest temperature and pressure (e.g., about 300° F. and 55 p.s.i.a.), vessel 44 at the next highest (e.g., about 275° F. and 35 p.s.i.a.), and vessel 45 at the lowest (e.g., about 230° F. and 15 p.s.i.a.). The relative flow rates of the combined spent absorbing solution and mother liquor streams sent to each of the vessels varies in relation to the pressure differences between the vessels and in relation to the areas of the heat exchange surfaces. Thus, about 45 percent of the feed is introduced to desorbing vessel 43, about 32 percent to desorbing vessel 44, and about 23 percent to desorbing vessel 45.

A recycle stream of slurry is heated in connection with each of the vessels 43, 44 and 45, the heating being done in calandrias 46, 47 and 48, respectively. Steam, at about 320° F. 75 p.s.i.g., is introduced to calandria 46 through line 49 as the prime energy source for the desorption zone. Calandria 47, meanwhile, is heated by the sulfur dioxide and water-containing overhead vapors in line 50 from desorbing vessel 43, and calandria 48 is similarly heated by the overhead vapors in line 51 from desorbing vessel 44. The condensate (water from calandria 46 is sent through lines 52 and 53 to dissolving tank 54. In calandrias 47 and 48 the indirect heat exchange contacting effects condensation of a portion of the steam, but not the sulfur dioxide, in the overhead gases from desorbing vessels 43 and 44. The steam condensate is sent through lines 55, 56 and 53 to dissolving vessel 54, while the uncondensed vapors are carried through lines 57 and 58 to line 59. Lines 57 and 58 each typically contain about 40 weight percent sulfur dioxide and the balance being essentially water vapor. The overhead vapors from desorbing vessel 45 are removed from the vessel in line 72 and are combined in line 59 with the aforementioned cooled vapors leaving calandrias 47 and 48. Line 72 typically contains about 9 weight percent sulfur dioxide and the balance being essentially water vapor. The combined vapors in line 59 can be sent to rectification (not shown).

Portions of the recycling slurry of each of the desorbing vessels 43, 44 and 45 are withdrawn (lines 60, 61 and 62, respectively) and are combined in line 63; the combined stream is then sent to drum filter 64. The combined slurries in line 63 contain, for example, about 15 weight percent sodium sulfite, the equivalent of about 34 weight percent sodium pyrosulfite, and the balance being essentially water. The slurry is filtered on drum filter 64, with the filtrate being sent through line 65 to mother liquor hold-up tank 66 and the damp filter cake being sent through line 67 to dissolving tank 54. The filter cake typically contains about 13 weight percent water, about 78 weight percent sodium sulfite, and the equivalent of about 9 weight percent sodium pyrosulfite. The mother liquor is withdrawn from tank 66 through line 68 and recycled through line 20' to the main spent absorbing solution feed line 21'. As in the system depicted in FIG. 1, a sulfate purge line (line 73) and an alternate purge line (line 69) are provided for the control of the sodium sulfate concentration in the system. Line 20' typically contains about 7 weight percent sodium sulfite, about 40 weight percent sodium bisulfite (calculated as the pyrosulfite), and the balance being essentially water.

The solids from line 67 are dissolved in tank 54 in the water of condensation that is obtained from calandrias 46, 47 and 48. Make-up water, for example from rectification (not shown), is supplied through line 70, and make-up sodium ion, for example as an aqueous sodium hydroxide solution, is added to the dissolving tank through line 71. The lean absorbing solution thus prepared in tank 54 is withdrawn through line 15' and is sent to the absorption zone of the process. The solution typically contains about 24 weight percent sodium sulfite, about 3 weight percent sodium bisulfite (calculated as the pyrosulfite), and the balance being essentially water.

Absorbing solution is continuously removed from the absorber through lines 16 and 17. That portion of the solution which is removed through line 16 is recycled to the incoming lean absorbing solution in line 15 while that which is removed through line 17 is split into a recycle stream, line 18, which is sent back to the absorber at an intermediate point, and line 19, which is sent to the desorption zone of the process. In the aforementioned sodium sulfite example, the spent absorbing solution in line 17 would typically have a pH of about 5.0 and would contain about 7 weight percent sodium sulfite, about 28 weight percent sodium bisulfite (calculated as $Na_2S_2O_5$), about 2.2 weight percent sodium sulfate and the balance being essentially water.

EXAMPLES III AND IV

Essentially the same procedure used in Example I is followed, except that lithium sulfite is used instead of sodium sulfite for Example III and beryllium sulfite is used instead of sodium sulfite for Example IV, and substantially a same result is obtained.

We claim:

1. In the method of removing sulfur dioxide from a gas containing the same by:

contacting said gas in an absorption zone with a lean, aqueous absorbing solution of a metal sulfite selected from the group consisting of sodium, lithium and beryllium sulfites so as to absorb the sulfur dioxide by converting sulfite to bisulfite and yield a spent absorbing solution containing the corresponding metal bisulfite;

charging spent absorbing solution to one or more desorption zones wherein said spent absorbing solution is subjected to conditions of temperature, pressure and residence time sufficient to decompose bisulfite to sulfite, sulfur dioxide and water, to evaporate sulfur dioxide and water from the solution and to precipitate sulfite from the solution;

separating precipitated sulfite from said solution to provide a mother liquor;

dissolving separated sulfite in water;

and recycling resulting sulfite solution to the absorption zone;

the IMPROVEMENT comprising recycling the major portion of said mother liquor to one or more of said desorption zones to which said spent absorbing solution is charged and maintaining the bisulfite-to-sulfite weight ratio in the total of recycled mother liquor and spent absorbing solution conducted to the desorption zone at at least about 1:1.

2. The improvement of claim 1 wherein the metal sulfite is sodium sulfite.

3. The improvement of claim 1 wherein substantially all of said mother liquor is recycled to one or more of said desorption zones to which said spent absorbing solution is charged.

4. The improvement of claim 3 wherein mother liquor is recycled by combining it with spent absorbing solution at a point immediately upstream of the desorption zones.

5. The improvement of claim 1 wherein said weight ratio of bisulfite to sulfite in said total of recycled mother liquor and spent absorbing solution conducted to the desorption zones is maintained at at least about 4:1.

6. The improvement of claim 1 wherein a portion of spent absorbing solution is recycled to the absorption zone to help maintain said bisulfite-to-sulfite ratio.

7. The improvement of claim 2 wherein the lean, aqueous absorbing solution of sodium sulfite contains about 10 to 35 weight percent of sodium sulfite and up to about 15 weight percent of sodium bisulfite, with the proviso that the total solids content of the solution is in the range of about 15 to 35 weight percent and the sodium sulfite constitutes at least about 75 weight percent of the total solids content.

8. The improvement of claim 7 wherein the spent absorbing solution contains about 10 to 50 weight percent of sodium bisulfite and up to about 20 weight percent of sodium sulfite.

9. The improvement of claim 8 wherein both the lean and the spent absorbing solutions contain minor, effective amounts of an oxidation inhibitor.

10. The improvement of claim 9 wherein the oxidation inhibitor is hydroquinone and is present in both solutions in the amount of about 0.01 to 0.3 weight percent.

11. The improvement of claim 1 wherein the contacting of the gas with the lean absorbing solution in the absorption zone is effected by allowing the solution to descend by gravity over a series of alternating disc and ring baffles while passing the gas upwardly through said descending solution.

12. The improvement of claim 11 wherein the sulfur dioxide-containing gas, prior to being contacted in said absorption zone, is scrubbed to remove suspended solids and highly water-soluble components therefrom by being conducted through a bed of column packing which is maintained wet and flushed with water.

13. The improvement of claim 1 wherein the desorption zones is comprised of a plurality of distinct desorbing vessels, each of which is maintained at a different pressure, said solution is conducted in parallel feed relationship to said plurality of desorbing vessels and said vessels are staged in multi-effect relationship so that the overhead from all but the lowest pressure vessel is brought into indirect heat exchange contact with the solution being desorbed in the next lowest pressure vessel.

14. The improvement of claim 1 wherein a desorption zone temperature of up to about 300° F. is employed.

15. The improvement of claim 5 wherein the metal sulfite is sodium sulfite.

16. The improvement of claim 15 wherein a portion of the removed spent absorbing solution is recycled to the absorption zone to help maintain said bisulfite-to-sulfite ratio.

17. The improvement of claim 16 wherein the lean, aqueous absorbing solution of sodium sulfite contains about 10 to 35 weight percent of sodium sulfite, up to about 15 weight percent of sodium bisulfite and up to about 10 weight percent of sodium sulfate, with the proviso that the total solids content of the solution is in the range of about 15 to 35 weight percent and the sodium sulfite constitutes at least about 75 weight percent of the total solids content.

18. The improvement of claim 17 wherein a desorption zone temperature of up to about 300° F. is employed.

19. The improvement of claim 1 wherein the sulfur dioxide and water which is evaporated in the desorption zone is recovered.

20. The improvement of claim 19 wherein the water used for dissolving precipitated sulfite comprises water which was evaporated in the desorption zones and recovered.

21. The improvement of claim 19 wherein the sulfur dioxide-containing gas, prior to being contacted in said absorption zone, contains about 0.05 to 10 mole percent of sulfur dioxide.

22. The improvement of claim 21 wherein the sulfur dioxide-containing gas, prior to being contacted in said absorption zone, contains about 0.05 to 0.5 mole percent of sulfur dioxide.

23. In the method of removing sulfur dioxide from a gas containing same by:

contacting the gas in an absorption zone with a lean, aqueous absorbing solution of sodium sulfite so as to absorb the sulfur dioxide by converting sulfite to bisulfite and yield a spent absorbing solution of sodium bisulfite, said lean absorbing solution containing about 10 to 35 weight percent of sodium sulfite, and up to about 5 weight percent of sodium bisulfite with the proviso that the total solids content of the solution is in the range of about 20 to 30 weight percent and the sodium sulfite constitutes at least about 85 weight percent of the total solids content;

charging spent absorbing solution to one or more desorption zones wherein said spent absorbing solution is subjected to conditions of temperature, pressure and residence time sufficient to decompose sodium bisulfite to sodium sulfite, sulfur dioxide and water, to evaporate sulfur dioxide and water from the solution and to cause sodium sulfite to precipitate from the solution, said desorption zone temperature being up to about 300° F.;

separating precipitated sodium sulfite from said solution to provide a mother liquor;

dissolving separated sodium sulfite in water;

recycling resulting sodium sulfite solution to the absorption zone;

recovering sulfur dioxide and water which is evaporated in the desorption zones; and using said recovered water for said dissolving of precipitated sodium sulfite;

the IMPROVEMENT comprising recycling said mother liquor to one or more of said desorption zones to which said spent absorbing solution is charged by combining substantially all of said mother liquor with the spent absorbing solution at a point immediately upstream of said desorption zones, maintaining the bisulfite-to-sulfite weight ratio in the total of recycled mother liquor and spent absorbing solution conducted to the desorption zones at at least about 4:1, recycling a portion of the spent absorbing solution to the absorption zone so as to help maintain said bisulfite-to-sulfite ratio, and employing as the desorption zones a plurality of distinct desorbing vessels, each of which is maintained at a different pressure, said solution being conducted in parallel feed relationship to said plurality of desorbing vessels and said vessels being staged in multi-effect relationship so that the overhead from all but the lowest pressure vessel is brought into indirect heat exchange contact with the solution being desorbed in the next lowest pressure vessel.

* * * * *